Figure 6:
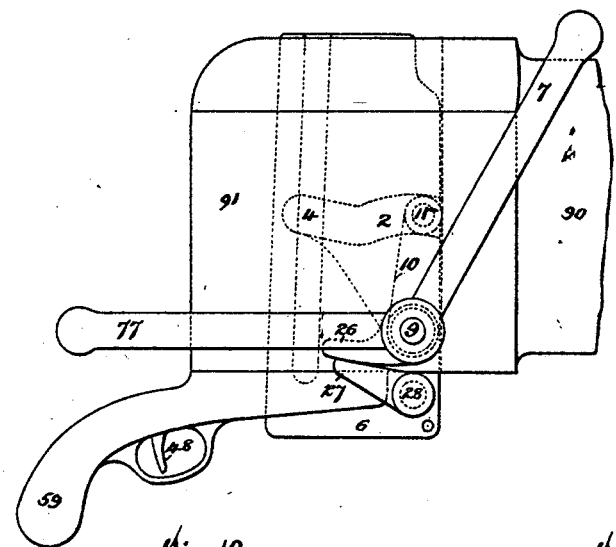

(No Model.) 4 Sheets—Sheet 1.
B. B. HOTCHKISS.
BREECH LOADING CANNON.
No. 270,590. Patented Jan. 16, 1883.
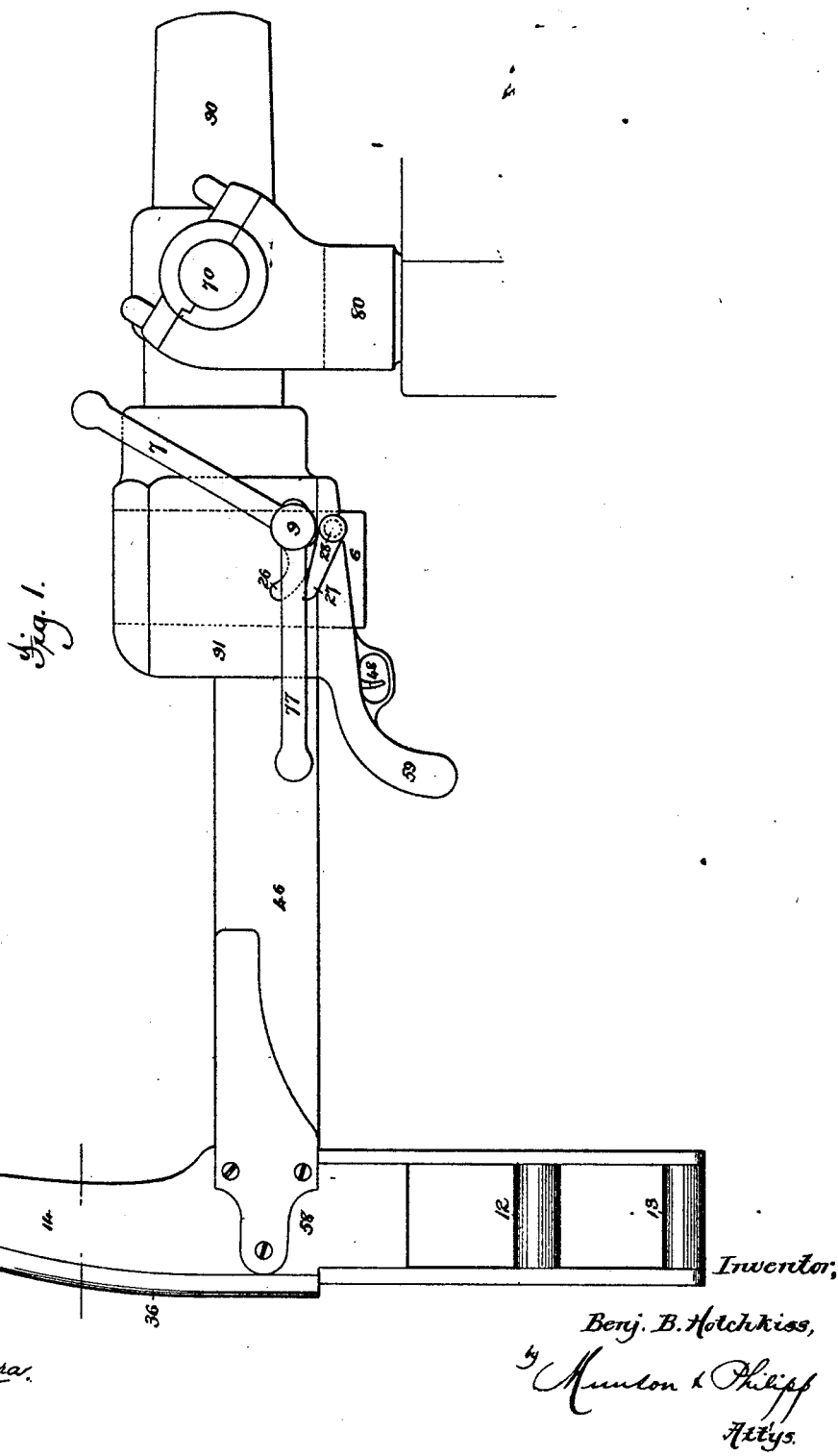
Attest:
Geo. H. Graham
A. N. Jasbera
Inventor:
Benj. B. Hotchkiss,
by Munson & Philipp
Attys.

(No Model.)  4 Sheets—Sheet 2.
B. B. HOTCHKISS.
BREECH LOADING CANNON.
No. 270,590. Patented Jan. 16, 1883.
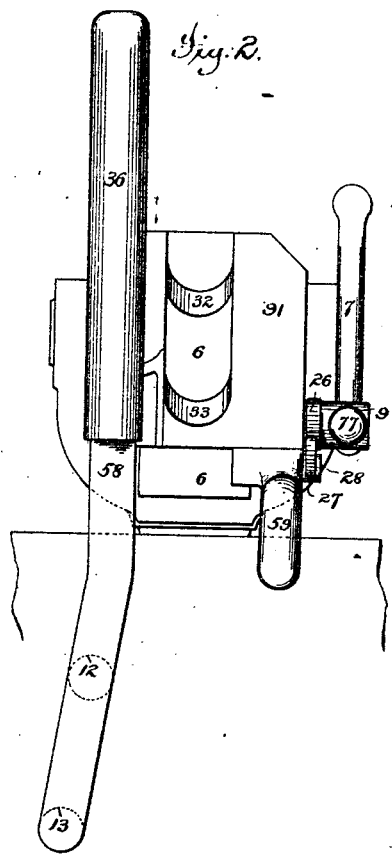
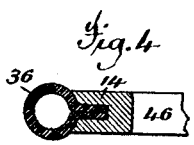
Attest:
Geo. W. Graham
A. N. Jasbera
Inventor,
Benj. B. Hotchkiss,
by Munson & Philipp
Attys.

(No Model.) 4 Sheets—Sheet 3.

B. B. HOTCHKISS.
BREECH LOADING CANNON.

No. 270,590. Patented Jan. 16, 1883.

Attest:
Geo. H. Graham
A. N. Jesbera

Inventor,
Benj. B. Hotchkiss,
by Muxton & Philipp
Attys.

(No Model.) 4 Sheets—Sheet 4.

B. B. HOTCHKISS.
BREECH LOADING CANNON.

No. 270,590. Patented Jan. 16, 1883.

Attest:
Geo. H. Graham
A. N. Jasbera

Inventor,
Benj. B. Hotchkiss,
by Munson & Philipp
Attys.

UNITED STATES PATENT OFFICE.

BENJAMIN B. HOTCHKISS, OF NEW YORK, N. Y.

BREECH-LOADING CANNON.

SPECIFICATION forming part of Letters Patent No. 270,590, dated January 16, 1883.

Application filed October 11, 1882. (No model.)

*To all whom it may concern:*

Be it known that I, BENJAMIN B. HOTCHKISS, a citizen of the United States, residing in the city of New York, county of New York, and State of New York, (temporarily domiciled in Paris, France,) have invented certain new and useful Improvements in Breech-Loading Cannon, fully described and represented in the following specification and the accompanying drawings, forming a part of the same.

This invention relates to that class of breech-loading ordnance in which the opening of the breech, extracting the empty shell, and cocking of the gun are accomplished by the movement of an actuating-lever in one direction, and the closing of the breech and the preparation for firing are accomplished by a movement of said lever in a contrary direction.

The invention consists in an improved construction of cocking-lever carried by the sliding breech-block, whereby the cocking is effected before the breech-block moves downward, which said lever is maintained out of contact with its actuating-cam during the entire movements of the said block, and yet is so related thereto as to prevent contact of the firing pin or nose of the hammer with the cartridge until the breech is properly closed and the gun ready to be discharged.

The invention consists in providing the sliding breech-block, which carries the hammer, mainspring, and trigger-sear housed within a cavity in its body, with a hinged door, whereby the said parts are not only protected, but may be readily reached for the purpose of cleaning or removal for repair, or to disable the gun.

The invention also includes an improved structure of actuating-lever, whereby a pulling movement, or one toward the gunner, accomplishes the lowering and raising of the breech-block.

The invention also comprehends an improved structure of shell-discharging guideway and improvements in the structure of the shoulder-piece, aiding the training of the gun.

Figure 10:
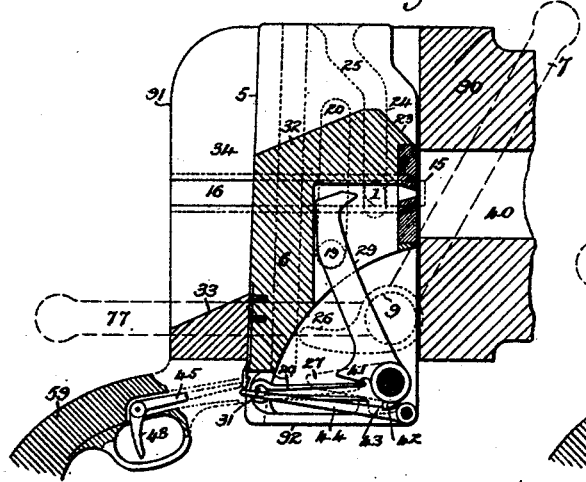
Figure 9:
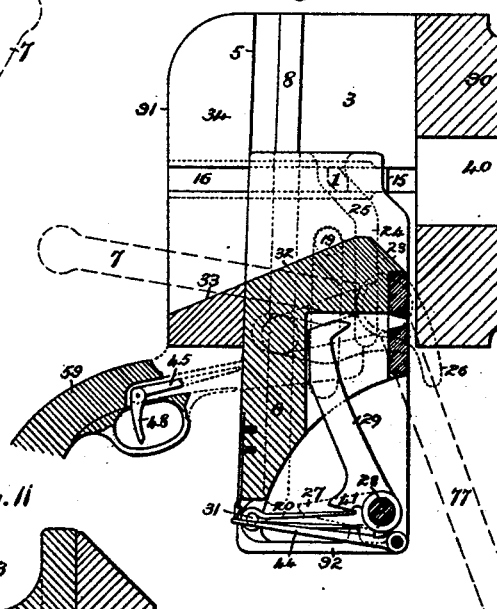
Figure 11:
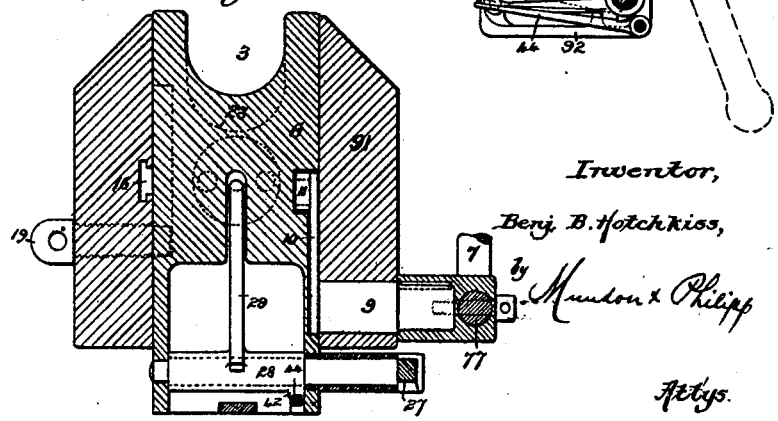
Figure 7:
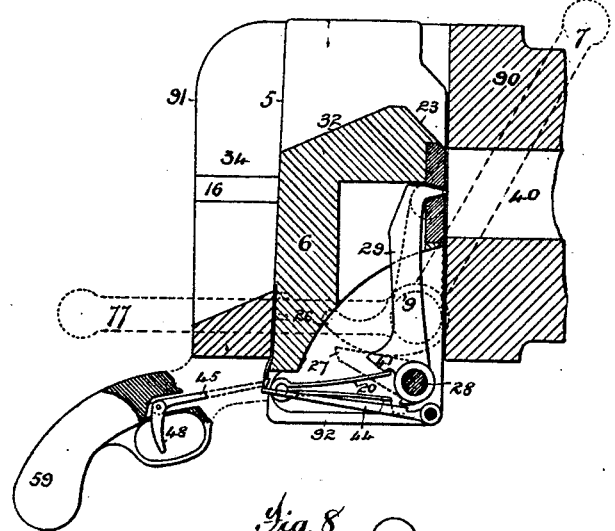
Figure 8:
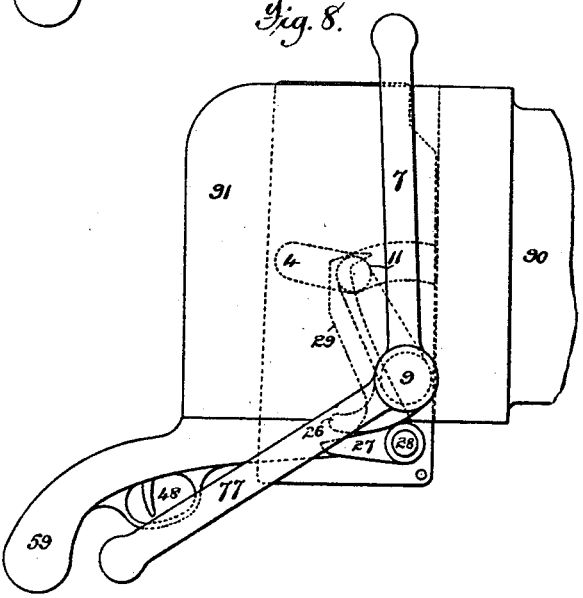

In the drawings, Figure 1 represents by a side elevation, and Fig. 2 by a rear elevation, a breech-loading cannon embodying the present improvements. Fig. 3 represents a cross-sectional view of the cushioned arm of the shoulder-piece, and Figs. 4 and 5 are similar views showing modified forms of the same. All of these figures are illustrated upon a smaller scale than are the remaining views. Fig. 6 represents a side elevation of the breech portion of the gun, showing by dotted lines the position of the crank when the breech-block is raised. Fig. 7 is a similar view showing by full lines the position of the hammer after the discharge. Fig. 8 is a longitudinal sectional elevation, showing the breech-block closed and the actuating-lever moved so far rearward as to accomplish the cocking of the hammer. Fig. 9 is a similar view showing the breech open ready for the operation of loading. Fig. 10 is a similar view showing the breech-block raised and the breech closed, the mechanisms being in the position for firing. Fig. 11 is a vertical cross-sectional elevation with the parts in the positions shown in Fig. 10.

The general structure of this cannon will be best understood by reference to the figures upon Sheets 3 and 4. It consists of a barrel, 90, either formed with or attached to an enlargement or breech, 91, in a recess through which moves a sliding breech-block, 6, to which breech is attached a rearwardly-extending bar, 46, that supports a shoulder-piece, 58, and which has an upper member, 14, designed to be pressed against by the left shoulder of the gunner, and a depending member carrying handles, as 12 13, which may be grasped by the left hand of the gunner. To the right-hand lower portion of the breech a handle or pistol grip, 59, is secured, which is designed to be seized by the right hand of the gunner. These two devices, the shoulder-piece and the pistol grip or handle, are thus so conveniently related to the gun as to enable the gunner to readily move the ponderous body composing the cannon, and to point and train the same with great facility in any direction, as the cannon is mounted by its trunnions 70 in a yoke, 80, which is vertically pivoted in the carriage.

The breech-piece is pierced vertically to form a recess, 3, to accommodate the sliding breech-block 6, which is guided in its vertical movements upon side bearers, 8, that project inward from the opposite side walls of the recess 3, and by the rear walls, 5, of the recess, in contact with which latter the rear face of the breech-block slides, which bearer 8 and walls 5 are given rearward inclination. In its uppermost position the front face of the breech-block is in contact, or nearly so, with the front wall of the recess 3, and since the bearers 8 are parallel with the rear walls, 5, of the recess, it follows that in its descent this breech-block will move slightly rearward, so that its front face will stand at quite a distance from the front wall of such recess when the block is in its downward position. (See Fig. 9.) Sliding or vertical movements are imparted to this breech-block by means of a crank, 10, which is mounted upon a shaft, 9, that is journaled in one wall of the breech-piece, (see Fig. 11,) and which shaft carries outside of the breech-block the compound actuating-levers 7 77 and a cam or tappet, 26.

The block is cut away to allow for the swinging movement of the crank 10, and is provided with a horizontal cam-slot, in which the stud or friction-roller 11, carried by the crank 10, moves. This cam-slot for about half its length forward is curved, as at 2, so that when the breech-block is raised this part 2 is concentric with the shaft 9, and the rearward part, 4, is given the proper cam shape to effect the movements of the block.

The breech-block is recessed in its lower portion and centrally, to allow room for the play of the hammer 29, which is mounted upon a shaft, 28, that is journaled in the lower forward part of said block, and extended therefrom at the right-hand side to carry the cocking-lever 27 in a position of vertical alignment with the cam 26, attached to the shaft 9, which is moved by the actuating-lever.

The mainspring 20, for imparting to the hammer a proper percussive blow, is a two-leaf spring held in place by a pin, 31, which passes through its bend, and is fixed in the lower rear side of the breech-block. The leaves of this spring bear respectively against the projection 41 on the heel of the hammer and a stud projecting from the plate-piece of the door 92 of the breech-block. The sear 43 of the trigger engages a detent, 42, on the heel of the hammer, and is provided with a tail or lever, 44, that projects rearward at a proper point to be engaged by an extension, 45, of the the trigger 48 at the proper time. Upon moving the actuating-lever so as to throw the crank-arm 10 rearward no movement will be imparted to the breech-block while the stud or roller 11 is traversing the part 2 of the cam-slot; but when the part 4 of the cam-slot is reached said roller will bear downward and cause the block to descend from the position shown in Fig. 8 to that shown in Fig. 9; but during this first movement of the actuating-lever, or while traveling from the position shown in Fig. 6 to that shown in Fig. 8, the cam 26 will be acting upon the cocking-lever 27, thereby rocking the shaft 28 and forcing back the hammer 29 against the pressure of its spring until the hammer is cocked by its detent 42 being engaged by the sear 43, which cocking will be effected as soon or about as soon as the stud 11 of the crank 10 completes its movement in the concentric part 2 of the cam-slot, as shown in Fig. 8, and while said stud or roller is passing through the cam part 4 of the slot it will act to force the breech-block downward, during which movement the cocking-lever 27 will leave the cam 26, for the reason that it is carried downward with the breech-block, as in Fig. 9. Thus no dragging action of the cocking-lever over the face of the cam 26 is performed, as is the case in a construction heretofore patented to me. The initial movement of the actuating-lever removes the firing-pin of the hammer from contact with the exploded shell, and since in practice a shell is found to stick more or less after it is fired it is necessary to start the same with a powerful but slow movement. The extractor 15, which embraces the flange of the shell, is given such a movement as follows: The extractor is arranged to slide in a groove, 16, cut in one side of the breech, and is provided with a stud, 1, entering a vertical slot cut in the breech-block. This slot has a part, 24, which is parallel either with the front or rear face of the said block, according to the range of movement desired, and it will in consequence of the rearward movement of the said block in its descent cause the said extractor to move slightly rearward so long as its stud runs in the said part 24 of the slot, which will be the case until the forward-inclined guideway 23, with which the upper forward portion of the block is provided, reaches the lower wall of the chamber 40, at which time the stud 1 passes into the part 25 of said slot, which has a quick inclination rearward, thus causing a rapid backward movement of the extractor in the further descent of the breech-block, and by which parts 24 25 of the slot is accomplished a powerful starting of the shell and the quick rearward-discharging movement thereof. When the breech-block has reached its lowermost position the devices will be in the position shown in Fig. 9, and the shell, which has been thrown rearward by the extractor, will have a guideway rearward, which is provided in part by the rearwardly-inclined surface 32 of the top of the breech-block and the corresponding bottom surface, 33, of the recess 34 in the breech, which recess 34 is cut to intersect the recess 3, but widthwise, of dimensions suited to accommodate the introduction of the cartridge and the discharge of its shell. For convenience of introducing the cartridge, the bar 46 of the shoulder-piece may be provided with a lateral projecting trough that co-operates with the guide-surface on upper side of block, as a trough for the cartridge, in manner similar to that shown in an application filed by me April 28, 1882. As the breech-block makes its descent the tripping-lever 44 of its sear is, together with the hammer, cocking-lever, and mainspring, carried bodily downward and away from the trigger, and when the reverse movement of the guiding-lever is made, so that the parts are raised to the position shown in Fig. 10, the said tripping-lever 44 will be brought underneath the trigger 45, as there shown, and the parts will be ready for the discharge of the cannon, the cocking-lever 27 then standing far enough away from the cocking-cam 26 to give the range of motion to the cocking-lever 27 required for the hammer.

An accidental tripping of the hammer and the premature discharge of the gun are prevented until all the parts are in position for the proper discharge by reason of the construction which prevents the hammer, even if tripped, from reaching the cartridge at any time before the block is elevated to its proper position, for the reason that should the hammer be tripped when in the position shown in Fig. 9 it would simply have contact with the rear of the lower forward wall of the recess 3, and when upon the movement of the actuating-lever the block has been so far raised as to to bring the cocking-lever 27 within the range of motion of the cocking-cam 26 said cam will again cock the hammer, thus withdrawing it before the cartridge is reached, and, having so cocked it, leave and rise above the same and stand as in Fig. 10, when the firing position is reached.

Cannon provided with shoulder-pieces and hand-grasps as heretofore constructed, especially in large calibers, have been provided with a side crank operating by a rotation to actuate the loading, cocking, and discharging mechanisms. Such arrangement requires two attendants in order to secure the most perfect precision of firing—a gunner to train the gun and an assistant to operate the said crank to bring the breech mechanism into position for firing.

By an improvement which introduced the use of an actuating-lever, as 7, in lieu of the crank-arm referred to, this class of guns was provided with a means whereby the gunner, in addition to aiming and pointing the gun, is enabled by a back-and-forth movement of his right hand to operate the breech mechanism through said lever, thus dispensing with the additional attendant. Practically this mode of handling such a gun, since the movement of said lever 7 must necessarily be a back-and-forth one, necessitated a corresponding movement of the body of the gunner, and was found to be not only inconvenient and tedious, but to greatly disturb the accuracy with which the gunner performing such a movement could train the gun. In order to avoid these difficulties and still render it practicable for the gunner to perform all the operations, this actuating-lever has been improved by being given the form of a bell-crank—that is, by having another member, as the lever 77, added to the shaft 9, whereby through a pulling movement, or one toward the gunner, he is enabled to both open and close the breech. Thus a pulling movement upon the lever 7 when in the position shown in Figs. 3 and 8 will cause the breech-block to descend, as in Fig. 9, whereby the breech is opened and the lever 77 carried into the position shown, when by a pulling movement upon this lever 77 the breech-block will be elevated to the position shown in Fig. 10 and the breech closed ready for firing, as there shown.

This improvement is of course applicable to all guns having breech mechanisms operated by a lever at the side of the gun—as, for instance, to those shown in my applications filed April 28, 1882, and October 14, 1882.

In practice it has been found that in the quick manipulation of a gun provided with a shoulder-piece, as in training a gun upon a torpedo-boat where the elevation requires to be quickly changed, in performing which the shoulder-piece slides too easily over the body of the gunner by reason of the momentum of the body of metal moved, thus making it difficult to reach the desired elevation or depression without repeated adjustment. To remedy this, the upper member, 14, of the shoulder-piece has been improved by providing it with a compressible cushion, 36, of rubber, which extends far enough longitudinally upon said shoulder-piece to provide such cushion as a bearing throughout the range of movement necessitated by the highest and lowest elevation of the gun. This cushion is made of rubber, or other material having similar characteristics, and may be in the form of a pipe, as shown in Figs. 1, 2, and 3, where it is secured to a curved seat upon the member 14 in any desired manner—as by nails or screws passed through the outer wall of the pipe, and entered through the inner wall of the pipe, so as to clamp the same. In Fig. 4 this cushion is shown as made of a flat piece of material, with its edges lapped together and entered into a slot in the part 14, where it may be secured by nails or rivets passing through the said part 14 and the lapped ends of the material. In Fig. 5 a further modification is made, whereby the edges of the material, which are brought into position to form the curved cushion, are fastened to the outside of the part 14 by nails or rivets. Another difficulty that has arisen in former structures of this shoulder-piece is the inconvenience of grasping the handles 12 13, when arranged in the same vertical plane as the part 14, by the left hand, which depends from the shoulder which rests against the member 14. To avoid this and give the gunner the greatest convenience of movement in seizing one or the other of the handles 12 13, the lower member of said shoulder-piece is given an inclination to the left, as shown in Fig. 2, which brings said handles 12 13 in different vertical planes from that of the member 14, and thus enables him to conveniently grasp either by the freest movement.

In former structures of cannon having vertically-sliding breech-blocks various means for guiding the ejected shells rearward have been adopted. In order to accomplish this in the most effective manner, the central portion of the upper surface from the highest point of the guideway 23 is given a rearward inclination, as shown in Figs. 9 and 10, whereby the inclined surface or guideway 32 is formed as a continuation rearward of said guideway 23, and the recess 34 in the rear part of the breech is also formed into an inclined guideway or surface, 33, that intersects with said guideway 32, as in Fig. 9, thus completing a rearward chute or guideway which will conduct the shells backward and onto the ground as they are thrown out by the action of the ejector.

The duplex form of actuating-lever shown might be made a spoked wheel.

If desired, the cocking-cam might be given a length and proper curve so as to be in contact with or maintain a close relation to the cocking-lever during the whole of the downward movement of the block.

What is claimed is—

1. The combination, with the sliding breech-block provided with a cam-slot having a part, 2, in which the driving-crank idly moves, and a cocking cam or tappet supported by the breech, of a cocking-lever attached to the hammer-shaft that is mounted in said block, the combination of parts being such that the operation of cocking the hammer is effected before the breech-block moves downward, substantially as described.

2. In a cannon or machine-gun having a sliding breech-block that is reciprocated by movements imparted by an actuating-lever, in which block the hammer is mounted, the combination, with said block and a cocking-cam carried by said lever, of a cocking-lever attached to the hammer and constructed to be carried and maintained out of contact with the cocking-cam as the block moves, substantially as described.

3. The combination, with the sliding breech-block, the hammer, and cocking-lever it carries, of the actuating-lever carried by the breech and provided with a cocking cam or tappet aligned with and arranged to swing out of the path of travel of the said cocking-lever as the block descends and into its path of travel as the block ascends, whereby the hammer, if tripped while the block is down, will be recocked as the block rises, and thus be prevented from producing a premature discharge of the cartridge, substantially as described.

4. In a machine-gun, a sliding breech-block provided with a cavity for receiving and carrying the firing mechanisms, and a door to cover its lower face and close said cavity and house the mechanisms, substantially as described.

5. In a machine-gun provided with a shoulder-piece for training it, the combination, with a sliding breech-block and means connecting its shaft therewith, of an actuating-lever composed of members, as described, adapting it to be moved in opposite directions to produce a reciprocation of the block by a pulling movement rearward, substantially as described.

6. The combination, with the breech having recesses, as 3 34, the latter of which has a rearwardly-inclined bottom wall or surface, as 33, of the sliding block provided with a rearwardly-inclined surface, as 32, substantially as described.

7. A pivoted gun having a shoulder-piece the upper member of which slides vertically over the body in the training operation, the same being provided with an elongated compressible cushion of rubber or similar material, substantially as described.

8. A shoulder-piece for aiding in the training of pivoted guns, consisting of an upright upper member constituting the shoulder-bearing, and a lower handle-carrying member that is inclined laterally, substantially as described.

9. The combination of the compound actuating-lever, the handle, as 59, and the shoulder-piece, substantially as described.

In testimony whereof I have hereunto set my hand in the presence of two subscribing witnesses.

B. B. HOTCHKISS.

Witnesses:
T. H. PALMER,
GEO. H. GRAHAM.